Sept. 5, 1972 H. M. RHODES 3,689,407
OIL AND WATER SEPARATING DEVICE
Filed Feb. 16, 1971
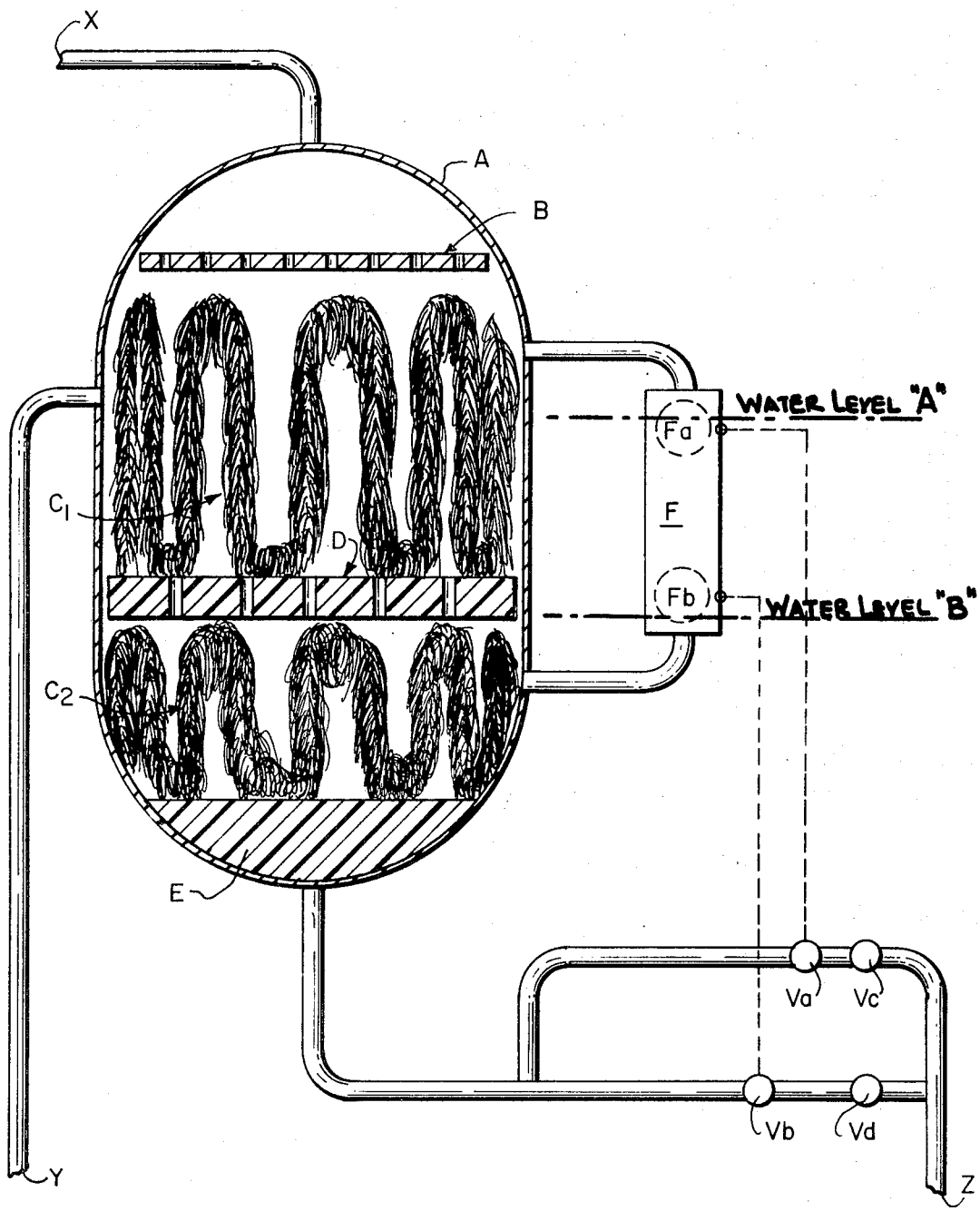
INVENTOR
HERBERT M. RHODES
BY
Wilkinson, Mawhinney & Thiebault
ATTORNEYS

3,689,407
OIL AND WATER SEPARATING DEVICE
Herbert M. Rhodes, New Orleans, La., assignor to
Oil Mop, Inc., Metairie, La.
Filed Feb. 16, 1971, Ser. No. 115,327
Int. Cl. B01d *15/06, 39/18*
U.S. Cl. 210—23                                5 Claims

ABSTRACT OF THE DISCLOSURE

The present disclosure is directed to a method and apparatus for separating oil from a mixture of oil and water by pouring the mixture over two oil attracting media each having a different physical characteristic and placing the second oil attracting media between two floats having different specific gravities so that the second oil attracting media is wrung out due to its compression between the two floats to release the oil and to permit it to rise above the water level in the apparatus so that the oil may be drawn off separately from the water.

---

An object of the present invention is to separate oil from water by use of an oil mop made from a large number of thin narrow strips of polypropylene as shown and described in my copending application for Letters Patent entitled "An Oil Mop and Method of Using Same" filed July 6, 1970 and assigned Ser. No. 52,448.

A further object of the present invention is to provide two oil attracting zones through which a mixture of oil and water is passed, each zone having a different physical characteristic due to the size of the material from which it is made so as to attract oil until the oil due to its buoyancy characteristic floats to the surface of the water.

A still further object of the present invention is to provide a method and apparatus which will receive and separate a continuous flow of a mixture of oil and water under pressure to afford quick relief to oil polluted water to protect fish and wildlife from oil spills.

With the foregoing and other objects in view, the invention will be more fully described hereinafter, and will be more particularly pointed out in the claims appended hereto.

In the drawing, wherein like symbols refer to like or corresponding parts throughout.

The single drawing is a mechanical schematic of one form of apparatus for practicing the method of the present invention.

Referring now to the drawing, A designates a vessel or container which may be built in sections joined by bolted flanges to permit access to the vessel for replacing oil attracting media and floats as necessary incident to use.

A is a pressure vessel of any convenient size or configuration to accommodate the pressure of the process at X, Y and Z (by example 75 gallons, 24 inch diameter). B is a distribution pan to provide an even flow of the stream through the filter media (by example 24 inch diameter, 1 inch thick and 24¼ inch diameter holes). C is the filter media consisting of an oil mop or other configuration of thin narrow strips or other configuration of polypropylene or similar velocity-viscosity sensitive material constructed as shown and described in my above copending application. The oil attracting media of $C_1$ is coarse (by example 12 mils), while the oil attracting media $C_2$ is fine (by example 6 mils), which enhances the operation of the filter.

D is a float of sealed polystyrene with perforations or any convenient non-absorbent material with a low specific gravity and relatively high mechanical strength, by way of example (24 inch diameter cast polystyrene, 2 inches thick with 24¼ inch diameter holes drilled symmetrically and having a specific gravity of the order of 0.1). E is a float similar to D except without perforations and with a higher specific gravity (for example, specific gravity of the order of 0.9). F is a float chamber with two floats or a similar system for controlling liquid level at two set points. V$a$, V$b$, V$c$ and V$d$ are valves of any convenient size (by example ¾ inch nominal pipe size).

Oil and water in any proportion enter the vessel A at X under pressure and are distributed evenly over the filter media C by distribution pan B. Separation of the oil and water takes place as the oil and water flow through the oil attracting filter media, the oil being retained by the filter media and the water falling freely to the bottom. As the water level builds up float E attempts to rise and is restrained by the filter media $C_2$ which also has a specific gravity of the order of 0.92 causing the filter media to be in slight compression. With valve V$d$ open, the water level rises until control is exercised by float F$b$ and valve V$b$. Float D floats at the water level B and the flow-stream and float valve F$b$ and V$b$ reaches equilibrium allowing the oil to accumulate on filter media $C_1$ and the water to discharge at Z. As the oil accumulates on filter media $C_1$ it forms drops large enough to overcome the attraction of the filter media and the drops rise to the surface of the water level B.

The oil accumulates at water level B. If the oil is re-entrained in the water flow stream, it is captured by filter media $C_2$ until the drops become large enough to re-float to the surface by overcoming with buoyancy the attracting force of the filter media. If the oil has a specific gravity of more than one or if the oil is of such type that it has a very strong attraction to the filter media it will be retained by the filter media until the filter media is reused or is cleansed and replaced.

When a sufficient amount of oil is accumulated at water level B, valve V$c$ is opened and valve V$b$ may be closed by an automatic programming device or by manual operation allowing the water level set point at water level B to be temporarily transferred to the set point at water level A as controlled by float F$a$ and valve V$a$. When the set point is changed from water level B to water level A the water increases the buoyancy force of float E and float D. Float E compresses filter media $C_2$ and float D compresses filter media $C_1$ wringing the oil from the filter media which goes to the water surface and accumulates until it flows out at Y. After sufficient time for wringing is allowed the control is transferred from water level A set point back to water level B set point as exercised by float F$b$ and valve V$b$ by opening valve V$d$ and closing valve V$c$. The filter is now ready to recycle.

I claim:
1. The method of separating oil from water comprising:
   (a) passing a mixture of oil and water through a fluid confining means,
   (b) subjecting the mixture to an oil separating mop media of long lengths of groups of thin gauge narrow strips of polypropylene,
   (c) said lengths of groups of narrow strips of polypropylene being secured to a center line so that the center of mass of narrow strip groups is on the center of pull of the line,
   (d) maintaining an oil/water interface along the mop media when the filter mop media is subjected to the oil/water mixture, and
   (e) removing the oil and water separately from the fluid confining means.

2. The method of separating oil from water comprising:
(a) introducing a mixture of oil and water into a fluid confining means,
(b) subjecting the mixture to a first oil attracting media made from thin narrow strips of polypropylene of the order of 12 mils locked to a centerline,
(c) subjecting the flow of mixture from the first oil attracting media to a second oil attracting media made from thin narrow strips of polypropylene of the order of 12 mils locked to a centerline,
(d) subjecting the second oil recovering media to a compression proportional to the amount of recovery of water, and
(e) removing the oil and water separately from the vessel.

3. An apparatus for separating oil from water comprising:
(a) a vessel,
(b) a mass of first oil attracting media comprising a mass of thin narrow strips of polypropylene of the order of 12 mils locked to a centerline,
(c) a mass of second oil attracting media comprising a mass of thin narrow strips of polypropylene of the order of 6 mils locked to a centerline beneath said mass of first oil attracting media,
(d) a perforate float in said vessel between said first and second oil attracting media,
(e) an imperforate float beneath said second mass of oil attracting media responsive to water so that water passed from the two oil attracting media cause the float to rise and compress the second mass of oil attracting media between the two floats to wring the oil from the second media mass and permit it to rise to the first mass of oil attracting media,
(f) means for drawing off the oil in said vessel above the first float, and
(g) means for drawing off water from beneath the imperforate float.

4. The apparatus of claim 3 wherein the perforate float is a two inch thick cast polystyrene float having a specific gravity of the order of 0.1.

5. The apparatus of claim 3 wherein the imperforate float is of polystyrene having a specific gravity of the order of 0.9.

References Cited

UNITED STATES PATENTS

| | | | |
|---|---|---|---|
| 3,617,551 | 11/1971 | Johnston et al. | 210—40 X |
| 3,352,778 | 11/1967 | Brink et al. | 210—23 |
| 3,497,069 | 2/1970 | Lindenthal et al. | 210—283 X |
| 3,558,482 | 1/1971 | De Young | 210—23 |
| 3,617,548 | 11/1971 | Willihnganz | 210—23 |
| 3,535,235 | 10/1970 | Schouw | 210—30 |

REUBEN FRIEDMAN, Primary Examiner

T. G. WYSE, Assistant Examiner

U.S. Cl. X.R.

210—30, 40, 350, 355, 496, DIG 21